United States Patent [19]

Liboff et al.

[11] Patent Number: 4,626,792
[45] Date of Patent: Dec. 2, 1986

[54] PURE CRYSTAL EXCITON LASER AMPLIFIER AND METHOD OF OPERATION

[75] Inventors: Richard L. Liboff, Ithaca; Kung C. Liu, Rochester, both of N.Y.

[73] Assignee: Cornell Research Foundation, Inc., Ithaca, N.Y.

[21] Appl. No.: 569,637

[22] Filed: Jan. 10, 1984

[51] Int. Cl.$^4$ .......................... H01S 3/00; H01L 33/00
[52] U.S. Cl. ........................................ 330/4.3; 372/41; 372/43
[58] Field of Search ..................... 330/4.3; 372/41, 43, 372/70

[56] References Cited

U.S. PATENT DOCUMENTS

| | | | |
|---|---|---|---|
| 3,142,760 | 7/1964 | Iams | 330/4.3 |
| 3,292,102 | 12/1966 | Byrne | 330/4.3 |
| 3,312,905 | 4/1967 | Lewis | 372/4.30 |
| 3,333,206 | 7/1967 | Bret et al. | 330/4.3 |
| 3,484,714 | 12/1969 | Koester et al. | 330/4.3 |
| 3,513,402 | 5/1970 | Marrison | 372/41 |
| 3,991,386 | 11/1976 | Byorkland et al. | 372/42 |
| 4,081,764 | 3/1978 | Christmann et al. | 372/43 |
| 4,205,329 | 5/1980 | Dingle et al. | 372/99 |
| 4,490,822 | 12/1984 | Walling et al. | 372/41 |
| 4,528,464 | 7/1985 | Chemla et al. | 372/50 |

OTHER PUBLICATIONS

"Semiconductor Laser Amplifier", J. W. Crowe and W. E. Ahern, IEEE Journal of Quantum Electronics, vol. QE-2, No. 8, Aug. 1966, pp. 283–289.
"A Nonresonant Multipass $CO_2$-Laser Amplifier", H. Kogelnik and T. J. Bridges, IEEE Journal of Quantum Electronics, vol. QE-3, 1967, pp. 95–96.
"Gain Characteristics of $CO_2$ Laser Amplifiers at 10.6 Microns" P. K. Cheo and H. G. Cooper, IEEE Journal of Quantum Electronics, vol. QE-3, No. 2, Feb. 1967.
"The Use of a Multipath Cell as a $CO_2$-N Gas Laser Amplifier and Oscillator", George J. Dezenberg and James A. Merritt, Applied Optics, vol. 6, No. 9, 1967.
"Saturation Operation and Gain Coefficient of a Neodymium-Glass Amplifier", C. G. Young and J. W. Kantorski, Applied Optics, vol. 4, No. 12, Dec. 1965.
"A Helium-Neon Laser Amplifier", L. E. S. Mathias and N. H. Rock, Applied Optics, vol. 4, No. 1, Jan. 1965, pp. 133–135.
Liboff et al., "Exciton-Laser Amplifier", 12/1/82, pp. 1–9, NTIS AD-A130-036/7, Abst. Provided.
Liboff, R. L., Kinetic Theory", 4/27/81, pp. 1–9, NTIS AD-A129-437/0, Abst. Provided.
Liboff, R. L., "Final Report on Grant . . . 1983", 7/3/83, pp. 1–13, NTIS AD-A136519/6, Abst. Provided.
Liu et al., Criterion for Exciton Lasing in Pure Crystals", 10/83, pp. 5633–5636, J. Appl. Phys., vol. 54, #10.

Primary Examiner—Nelson Moskowitz
Attorney, Agent, or Firm—Jones, Tullar & Cooper

[57] ABSTRACT

A laser amplifier and method as disclosed wherein excitons in a pure insulator or semiconductor crystal are triggered by incident resonant laser radiation. The excitons are created by an external intermittent radiative source, and stimulated decay produces light output at a wavelength characteristic of the crystal. The radiative source produces light at the same wavelength as the light output produced by stimulated exciton decay, thereby producing an amplified output.

12 Claims, 2 Drawing Figures

PURE CRYSTAL EXCITON LASER AMPLIFIER AND METHOD OF OPERATION

BACKGROUND OF THE INVENTION

This invention arose out of research sponsored by the U.S. Department of the Air Force under Contract AFOSR 78-3574. The U.S. Government has certain rights in this invention.

The present invention relates, in general, to light amplifiers, and more particularly to a laser amplifier wherein the amplifying material is pumped by a flash lamp to produce excitons, exciton decay being triggered by an incident resonant radiation signal which is to be amplified.

It is well recognized that for a variety of laser applications, it is desirable to amplify an existing light beam in order to produce a higher intensity, essentially monochromatic, optical beam. For example, in any practical communication system using laser beam, it is essential to provide repeater stations at which amplification of the message-carrying beam can take place. Such amplifiers may take the form of laser devices without the feedback normally supplied by the end mirrors in a conventional oscillating beam generator and, in conventional manner, may utilize a material having an inverted population.

Amplification of laser beams has been attained in the past at a number of different wavelengths; however, in solid state and semiconductor devices it has been found that high gain can only be achieved at low power levels. See, for example, "Semiconductor Laser Amplifier", J. W. Crowe and W. E. Ahern, IEEE Journ. of Quantum Elec., vol. QE-2, No. 8, Aug. 1966, pp. 283-289. Gas amplifiers have been found to operate continuously with little noise but only at lower power, with the exception of $CO_2$ amplifiers which operate at high power, but with low gain. See, for example, "A Non-Resonant Multipass $CO_2$ Laser Amplifier", H. Kogelnik and T. J. Bridges, IEEE Journ. of Quantum Elec., vol. QE-3 (1967), pp. 95 and 96, and also "Gain Characteristics of $CO_2$ Laser Amplifiers at 10.6 Microns", P. K. Cheo and H. G. Cooper, IEEE Journ. of Quantum Elec., vol. QE-3, (1967), pp. 79-84. See also "The Use of a Multipass Cell as a $CO_2$—$N_2$ Gas Laser Amplifier and Oscillator", G. J. Dezenberg and J. A. Merritt, Appl. Optics. Vol. 6, No. 9, Sept. 1967, pp. 1541-1543.

Attempts to overcome the problem of low power gain include the use of multistage lasers such as those illustrated in U.S. Pat. No. 3,292,102 to Byrne, which shows a plurality of solid state laser sections optically pumped and coupled by rotating shutters. Similar attempts to increase the power through multiple stages are illustrated in U.S. Pat. Nos. 3,312,905, to Lewis and 3,333,206 to Brett et al.

SUMMARY OF THE INVENTION

Although the prior art has succeeded in obtaining amplification of laser beams, prior attempts which utilize multiple stages or which use materials containing impurity dopants produce output light beams which contain a band of frequencies, and thus do not produce an essentially monochromatic light. The broadening of the output frequency band is avoided in accordance with the present invention through the use of a pure insulator or semiconductor crystal in which excitons are generated by an external intermittent radiative source and which are then triggered by incident resonant laser radiation. Crystals with an impurity concentration of less than $10^{-7}$ percent would well serve in the operation of this device. The triggering of the excitons produces output radiation at a characteristic frequency which is dependent on the crystalline material, when the incident radiation is selected to be the same wavelength as the characteristic frequency of the crystal, the result is an amplified output light beam of the same frequency, or wavelength as the output. Thus, for example, the exciton decay wavelength in pure ZnS is 3201.71 Å. This crystal may, therefore, be used to amplify radiation produced by a dye laser at that same wavelength through the triggering of excitons in the crystal.

The lasing mechanism based on the stimulated decay of excitons depends upon the non-boson quality of excitons which, in turn, is assured by a sufficiently high exciton density in the crystal. An exciton is an excited state of an insulator or semiconductor material which allows energy to be transported without the transport of an electric charge; thus, it may be thought of as an electron and a hole in a single space. In a material where both free electrons and holes exist, the number of both can be reduced simply by a recombination of the electrons with the holes. While a direct recombination is only likely if the electron is in the immediate vicinity of the hole, recombination can be facilitated by the presence of what might be referred to as recombination states. These are energy levels which effectively lie between the valence and conduction bands and either above or below the Fermi level in p-type or n-type semiconductors, respectively.

The recombination states, or traps, as they are called, give rise to electron-hole pairs in the energy range between the valence and conduction band. The existence of these recombination states is a result of impurities or imperfections in the lattice. In the case of impurities, the recombination states are normally distinct from the dopants or substitutional impurities which act as electron donors or acceptors in n- or p-type semiconductors. Electron-hole pairs created by the excitation of electrons from the valence band into the recombination, or trap, states by the absorption of photons are called excitons. These are mobile within the crystal until recombination occurs.

A boson is a particle that obeys Bose-Einstein statistics, and this includes photons, pi-mesons, and all nuclei having an even number of particles and all particles with integer spin. Bose-Einstein statistics is the statistical mechanics of a system of identical bosons for which there is no restriction on the number of particles that may exist in the same quantum state simultaneously. In accordance with the present invention, excitons are produced to a sufficient density that they assume a non-boson quality. This occurs because of the fact that the ideal Bose commutation relations, as described in "Theory of the Contribution of Excitons to the Complex Dielectric Constant of Crystals", J. J. Hopfield, Physics Review, vol. 112 (1958), pp. 1555-1567, become increasingly invalid with the growth of the number of excited atoms in the crystal. The present invention is based on the discovery that a laser amplifier can be produced through the stimulated decay of excitons when the crystal is excited to produce excitons at a sufficient density that the statistical restrictions on the number of excitons that can exist in the same state become invalid.

BRIEF DESCRIPTION OF THE DRAWINGS

The foregoing and additional objects, features and advantages of the present invention will become apparent to those of skill in the art from a more detailed consideration thereof taken in conjunction with the accompanying drawings, in which.

DESCRIPTION OF A PREFERRED EMBODIMENT

Figure 1:
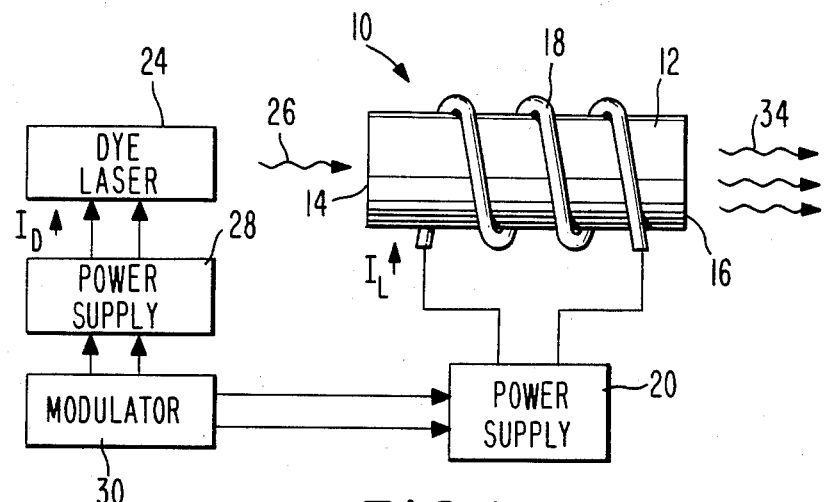
FIG. 1 is a diagrammatic illustration of a laser amplifier constructed in accordance with the present invention.

Turning now to a consideration of FIG. 1, there is illustrated generally at 10 a laser amplifier which operates in accordance with the principles of the present invention. The amplifier includes a solid crystal rod 12 which, in a preferred embodiment, is pure zinc sulfide (ZnS) but which may be other pure insulator or semiconductor crystals such as Si, Ge, ZnO, ZnSE, GaAs, CdS, and InSb. All of these crystals produce characteristic exciton decay output wavelengths, as illustrated in the following table.

TABLE 1

Characteristic Exciton Properties in Selected Crystals [3]

| Material | Energy gap $E_g$ (meV) | Binding energy $E_b$ (meV) | Photon energy $E_g - E_b$ (meV) | Wavelength (Å) |
|---|---|---|---|---|
| Si | 1112 | 14 | 1098 | 11290.5 (IR) |
| Ge | 803 | 3.6 | 799.4 | 15507.9 (IR) |
| ZnO | 3436 | 59 | 3377 | 3671.01 (V) |
| ZnS | 3911 | 39 | 3872 | 3201.71 (UV) |
| ZnSe | 2795 | 281 | 2514 | 4931.2 (O) |
| GaAs | 1519 | 4.2 | 1514.8 | 8183.9 (IR) |
| CdS | 2582 | 28 | 2554 | 4853.9 (O) |
| InSb | 235.2 | 0.4 | 234.8 | 52798.1 (IR) |

IR, O, V, UV = infrared, optical (i.e., visible), violet, ultraviolet

The crystal rod 12 includes parallel end faces 14 and 16, but does not incorporate the reflecting mirrors normally associated with laser sources, since such mirrors result in oscillation rather than the amplification desired in accordance with the present invention.

Figure 2:
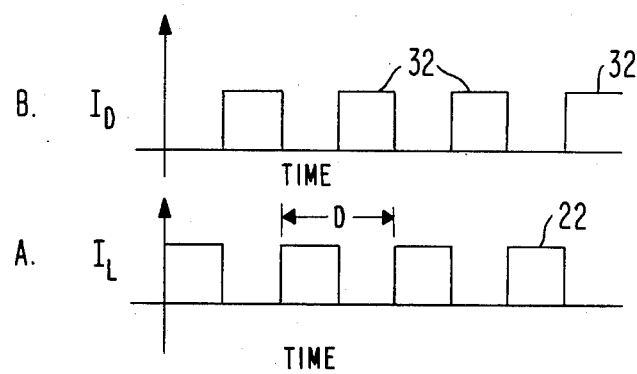
FIG. 2 is a diagrammatic illustration of the drive currents for the device of FIG. 1.

The laser element 12 is optically pumped in known manner by any suitable light source, such as a Xenon flash tube 18 coiled about the crystal. Although a Xenon flash tube is preferred, higher laser amplification would result from pumping the crystal 12 with either a nitrogen, eximer, neodymium, or YAG laser. The flash tube, or lamp, 18 is operated by a power supply 20 which in one embodiment, produces 1400 volts d.c., the lamp exhibiting 51 uF capacitance and zero inductance, producing input energy of 50 joules. A description of this flash lamp may be found in *Laser Electronics*, J. T. Verdeyen, Prentice Hall, Englewood Cliffs, N.J. (1981) page 258. The power supply feeds to flash lamp 18 an input current $I_L$ which has an On-Off profile illustrated in FIG. 2A by the pulses 22. The duration D between peaks of this profile is on the order of the lifetime of an exciton, or approximately $10^{-6}$ seconds.

Excitons in the pure crystal 12 are created by activation of the flash lamp, the exciton density growing during the "On" phase of the lamp to a peak value. During the "Off" phase of the lamp, stimulated decay of the excitons is produced by the input radiation which is to be amplified.

Triggering of the excitons in crystal 12 is accomplished by means of incident resonant radiation triggering source 24 which is axially aligned with rod 12, and preferably is a suitable dye laser of conventional type which produces output radiation 26. To prevent loss of excitons to coupling with phonons, the device should be operated at low temperature, e.g., that of liquid helium. The output has a wavelength which is the same as the characteristic exciton wavelength of the laser crystal 12. The dye laser 24 is driven by a suitable power supply 28 in a pulsed mode so that it has an On-Off profile which is $\pi$ radians out of phase with the frequency of the flash lamp 18. A suitable modulator 30 activates the two power supplies 20 and 28 to provide the required phase relationship. The On-Off profile for the dye laser 24 is produced by the triggering current $I_D$, illustrated in FIG. 2B at pulses 32.

Although a dye laser is preferred as the source of incident radiation 26, since the wavelength of the laser beam 26 can be accurately controlled and adjusted to match the wavelength characteristics of the laser material 12, nevertheless other trigger sources may be used.

Operation of the dye laser to produce the triggering radiation 26 immediately follows the pumping of crystal 12 to produce a high concentration of excitons. The dye laser 24 and the amplifier laser 12 are axially aligned so that the radiation to be amplified enters the crystal 12 and travels axially therethrough. This stimulates a resonant decay of the excitons within the crystal 12 to cause the crystal 12 to produce output radiation 34 which is coherent with the input wave 26 and which is at the characteristic frequency of the crystal 12. Since the wavelength of the input radiation was selected to be the same as the wavelength produced by crystal 12, the result is an amplified monochromatic and coherent output signal 34.

During the amplification interval, radiative power flux, S[W/m²], in the crystal satisfies the equation $$\frac{dS}{dx} = gS \quad (1)$$

wherein g is the gain, $$g = \kappa(\rho\sigma_d - \rho_o\sigma_a) \quad (2)$$

In this expression $\rho$ is density of excited atoms, and $\rho_o$ is density of atoms in the ground state. It follows that the total density of atoms, $\rho_T$, is given by $$\rho_T = \rho + \rho_o \quad (3)$$

The absorption cross section is $\sigma_a$ and $\sigma_d$ is the cross section for stimulated decay. Finally $\kappa$ described additional loss effects such as, for example, that due to reflection, impurities, missmatch between input and resonant frequencies, etc.

From the principle of microscopic reversibility and assuming non-degeneracy of excited and ground exciton levels, one may set $\sigma_d = \sigma_a$. Furthermore, for $\sigma$ we may write (in cgs units)

$$\sigma(\omega) = \frac{2\pi e^2 \omega g_L(\omega) d^2}{3\hbar c} \quad (4)$$

Here $\underline{d}$ is the dipole matrix element between Wannier state functions. At the site $\underline{l}$ it is given by $$\underline{d} = <c|\underline{r}|v|>. \tag{5}$$

Valence and conduction bands are denoted by v and c respectively. This matrix element is relevant to a transition between the ground and excited states of an exciton.

The term $g_L$ in (4) refers to the Lorentzian lineshape factor. On resonance it reduces to $$g_L = \frac{\tau}{\pi} \tag{6}$$

In this expression $\tau$ denotes the decay time of the exciton. As previously noted, $\tau \cong 10^{-6}$ sec.

A rough estimate of the matrix element (5) may be constructed as follows. We assume that the valence band is comprised of S atomic states and the conduction band is comprised of P atomic states. With $$\underline{s} = \underline{r} - \underline{l},$$

in the coordinate representation, the bra and ket vectors in (5) become, respectively, $$W_v(\underline{s}) = \frac{1}{\sqrt{4\pi} \; a^{3/2}} e^{-s/a} \tag{7}$$

$$W_c(\underline{s}) = \frac{s \, e^{-s/2a}}{(2a)^{3/2}a\sqrt{3}} \sqrt{\frac{3}{4\pi}} \cos\theta$$

where $\cos\theta \equiv \hat{z} \cdot \underline{s}/s$, for an arbitrary z-axis. Furthermore, $$a = \epsilon a_o^* = \epsilon h^2/m^* e^2$$

where $\epsilon$ is the dielectric constant. There results $$d = \frac{1}{a^4 3} \frac{1}{\sqrt{8}} \int_0^\infty ds \, s^4 \, e^{-3s/2a} \tag{8}$$

$$= \frac{2^7}{\sqrt{2} \; 3^5} a$$

With (6) and (8), $\sigma$ as given by (4) becomes $$\sigma = 8 \left(\frac{2}{3}\right)^{11} \alpha \omega \tau a^2 \tag{9}$$

where $\alpha$ is the fine structure constant.
Returning to (2), with (9) we write $$g = 8 \left(\frac{2}{3}\right)^{11} \alpha \omega \tau a^2 \kappa (\rho - \rho_o) \tag{10}$$

At 55% pumping efficiency, $\rho = 0.55\rho_T$, $\rho_o = 0.45\rho_T$ and (10) reduces to $$g = 8 \left(\frac{2}{3}\right)^{11} \alpha \omega \tau a^2 0.1 \kappa \rho_T \tag{11}$$

At $\omega \cong 10^{14}/s, \tau \cong 10^{-6}s, a \cong 0.5$ Å we find $$g \cong 1.14 \times 10^{-9} \kappa \rho_T cm^2 \tag{12}$$

Thus for $\kappa\rho_T > 10^9/cm^3$, $g > 1/cm$ and the device may be expected to amplify the input laser pulse.

We have described a laser-amplifier device based on stimulated decay of excitons in a pure crystal. An expression for the gain of the device together with a criterion for amplificiation were obtained. These expressions suggest practical use of the proposed device. The device presumes a non-bose like quality of excitons. This property is satisfied provided a sufficiently large number of atoms are excited, i.e., $\rho \gtrsim \rho_o$.

Although the present invention has been described in terms of a preferred embodiment, it will be understood that variations and modifications may be made without departing from the true spirit scope thereof as set forth in the following claims.

What is claimed is:

1. A laser amplifier comprising:
   a source of intense, monochromatic, coherent radiation to be amplified, said radiation have a selected wavelength;
   a laser rod having an axial first and second ends, and being axially aligned with said source of radiation, said first end being adapted to receive said radiation to be amplified, said laser rod comprising a pure, undoped crystal in which the recombination of excitons produces a characteristic output radiation having said selected wavelength;
   pumping means for producing electron population inversion within said laser rod and to a recombination energy level for the production of excitons within said laser rod the pure crystal laser rod providing a sufficiently high exciton density to assure a nonboson quality in said excitons; and
   means for alternately activating said pumping means and said source of radiation to first produce said high density of excitons in said laser rod and then to cause said radiation to be amplified to impinge on said first end of said laser rod to stimulate decay of said high density, nonboson quality excitons, such decay producing photons of said characteristic wavelength and resulting in intense monochromatic, coherent output radiation at said characteristic wavelength at said second end of said laser rod, said output radiation being at a greater intensity than, and at the same wavelength as, said source radiation, whereby said source radiation is amplified.

2. The laser amplifier of claim 1, wherein said laser rod is ZnS.

3. The laser amplifier of claim 1, wherein said source of radiation is a dye laser.

4. The laser amplifier of claim 1, wherein said pumping means comprises a flash lamp.

5. The laser amplifier of claim 4, wherein said flash lamp is a Xenon lamp.

6. The laser amplifier of claim 1, wherein said source of radiation is an intermittent, pulsed source.

7. The laser amplifier of claim 4, wherein said pumping means is intermittent.

8. The laser amplifier of claim 7, wherein said means for alternately activating said pumping means and said source of radiation comprises modulator means connected to said pumping means for activating said pumping means $\tau$ radians out of phase with said source of radiation.

9. The laser amplifier of claim 8, further including power supply means connected to drive said pumping means, said modulator means triggering said power supply to produce an alternating on and off profile for said pumping means.

10. The laser amplifier of claim 9 wherein the period of said modulator means is on the order of a lifetime of an exciton.

11. The laser amplifier of claim 10, wherein the period of said modulator means is approximately $10^{-6}$ sec.

12. The laser amplifier of claim 11, wherein said laser rod is at about the temperature of liquid helium to enhance the nonboson quality of excitons.

* * * * *

UNITED STATES PATENT AND TRADEMARK OFFICE
CERTIFICATE OF CORRECTION

PATENT NO. : 4,626,792

DATED : December 2, 1986

INVENTOR(S) : RICHARD L. LIBOFF and KUNG C. LIU

It is certified that error appears in the above-identified patent and that said Letters Patent is hereby corrected as shown below:

In Claim 7, column 6, line 63, "claim 4" should read --claim 6--.

Signed and Sealed this

Twenty-fourth Day of February, 1987

Attest:

DONALD J. QUIGG

Attesting Officer

Commissioner of Patents and Trademarks